US012794850B2

(12) United States Patent
Chawat et al.

(10) Patent No.: US 12,794,850 B2
(45) Date of Patent: Nov. 10, 2026

(54) SYSTEM AND METHOD FOR DOMAIN NAME REGISTRATION USING A CACHE

(71) Applicant: VeriSign, Inc., Reston, VA (US)

(72) Inventors: Raja Chawat, Herndon, VA (US); Anjaneyulu Sadineni, Ashburn, VA (US); Sunil Mundluri, Chantilly, VA (US); James Gould, Leesburg, VA (US)

(73) Assignee: VeriSign, Inc., Reston, VA (US)

( * ) Notice: Subject to any disclaimer, the term of this patent is extended or adjusted under 35 U.S.C. 154(b) by 0 days.

(21) Appl. No.: 17/881,768

(22) Filed: Aug. 5, 2022

(65) Prior Publication Data

US 2022/0377049 A1 Nov. 24, 2022

Related U.S. Application Data

(63) Continuation of application No. 15/476,032, filed on Mar. 31, 2017, now Pat. No. 11,411,913.

(51) Int. Cl.
*H04L 61/4511* (2022.01)
*H04L 61/3015* (2022.01)
(Continued)

(52) U.S. Cl.
CPC ........ *H04L 61/4511* (2022.05); *H04L 61/302* (2013.01); *H04L 61/3025* (2013.01);
(Continued)

(58) Field of Classification Search
CPC ......................... H04L 67/2842; H04L 67/289; H04L 67/2847
See application file for complete search history.

(56) References Cited

U.S. PATENT DOCUMENTS 7,167,904 B1 1/2007 Devarajan et al.
2001/0034657 A1 10/2001 Shuster et al.
(Continued)

OTHER PUBLICATIONS

Partial European Search Report dated Jul. 27, 2018, European Application No. 18165298.3, pp. 1-11.
(Continued)

*Primary Examiner* — John A Follansbee
*Assistant Examiner* — Christopher P Cadorna
(74) *Attorney, Agent, or Firm* — McCarter & English, LLP; Michael A. Sartori

(57) ABSTRACT

A system for allocating domain name acquisition resources is provided. The system performs a method comprising: obtaining, at a database, a list of domain names that are to be deleted during a first time window; updating a drop catch table in the database, wherein the drop catch table comprises a second list of domain names that are to be deleted; refreshing a cache in an application server that provides DNS services based on the drop catch table; obtaining, at the application server, a EPP command from a registrar to register a domain name from the drop catch table that is about to be deleted during a second time window; determining, based on the cache, that the domain name to be registered is available to be registered; updating a flag for the domain name in the cache indicating that the domain name is registered; and providing an acknowledgment to the registrar.

20 Claims, 5 Drawing Sheets

(51) Int. Cl.
*H04L 61/58* (2022.01)
*H04L 67/568* (2022.01)
*H04L 67/5682* (2022.01)

(52) U.S. Cl.
CPC ............ *H04L 61/58* (2022.05); *H04L 67/568* (2022.05); *H04L 67/5682* (2022.05)

(56) References Cited

U.S. PATENT DOCUMENTS

| | | | | |
|---|---|---|---|---|
| 2002/0010794 | A1 * | 1/2002 | Stanbach, Jr. | H04L 67/53 707/E17.116 |
| 2002/0091703 | A1 | 7/2002 | Bayles | |
| 2002/0091827 | A1 | 7/2002 | King et al. | |
| 2003/0225670 | A1 | 12/2003 | DeCarlo, III | |
| 2004/0172463 | A1 | 9/2004 | King et al. | |
| 2004/0199493 | A1 | 10/2004 | Ruiz et al. | |
| 2007/0214284 | A1 | 9/2007 | King et al. | |
| 2007/0271393 | A1 * | 11/2007 | Wong | H04L 61/00 709/245 |
| 2010/0058210 | A1 * | 3/2010 | Johnson | G06Q 30/0241 715/764 |
| 2013/0179895 | A1 * | 7/2013 | Calder | G06F 9/5077 718/104 |
| 2017/0054806 | A1 * | 2/2017 | Dhuse | H04L 65/10 |
| 2017/0317973 | A1 * | 11/2017 | Lam | H04L 61/4511 |

OTHER PUBLICATIONS

Extended European Search Report issued in corresponding European Patent Application No. 18165298.3 on Oct. 29, 2018.

* cited by examiner

SYSTEM AND METHOD FOR DOMAIN NAME REGISTRATION USING A CACHE

RELATED APPLICATIONS

This application is a continuation of the United States patent application having Ser. No. 15/476,032, filed Mar. 31, 2017, the subject matter of which is incorporated herein by reference.

FIELD

The present disclosure relates generally to domain name registration using a cache to store drop catch domain names.

BACKGROUND

As Internet usage grows exponentially, the demand for Internet-related services is also growing rapidly. As a result of the increased usage of the Internet, the demand for domain names is also growing rapidly. Consequently, demand for domain-related services is also on the rise. Such domain-related services can include domain name creation, domain name registration renewal, and the like. Typically, a website serves as a primary vehicle for establishing an online presence for a domain name. To meet this ever increasing demand for domain name-related services, it is necessary that the entities that provide these services do so in an efficient and cost-effective manner.

The Domain Name System ("DNS") is the part of the Internet infrastructure that translates human-readable domain names into the Internet Protocol ("IP") numbers needed to establish Transmission Control Protocol ("TCP")/IP communication over the Internet. DNS allows users to refer to web sites, and other resources, using easier to remember domain names, such as "www.example.com", rather than the numeric IP addresses associated with a website, e.g., 123.4.56.78, and assigned to computers on the Internet. Each domain name can be made up of a series of character strings (e.g., labels) separated by dots. The right-most label in a domain name is known as the top-level domain ("TLD"). Examples of well-known TLDs include .com, .net, .org, .edu, and .gov. Additional examples of TLDs include .biz, .info, and .name. Each TLD supports second-level domains, listed immediately to the left of the TLD, e.g., the "example" level in "www.example.com". Each second-level domain can include a number of third-level domains located immediately to the left of the second-level domain, e.g. the "www" level in www.example.com. The DNS registration system has also evolved to incorporate various country code TLDs ("ccTLDs"), each one reserved for use by a particular country, such as, .ca, .cn, and .us, associated with Canada, China, and the United States, respectively. The DNS and domain name registration system have also evolved to allow the use of alternative character sets to accommodate foreign languages.

The responsibility for operating each TLD, including maintaining a registry of the second-level domains within the TLD, is delegated to a particular organization, known as a domain name registry ("registry"). The registry is primarily responsible for answering queries for IP addresses associated with domains ("resolving"), typically through DNS servers that maintain such information in large databases, and operating its top-level domain. For most TLDs, in order to obtain a domain name, that domain name has to be registered with a registry through a DNS registrar, an entity authorized to register Internet domain names on behalf of end-users. Alternatively, an end-user can register a domain name indirectly through one or more layers of resellers. A registry may receive registrations from hundreds of registrars.

A registrar usually has a dedicated service connection with the registries in order to access domain-related services, e.g., domain name creation or renewal. Registrars typically use the Extensible Provisioning Protocol ("EPP") as a vehicle to communicate with the registries in order to register or renew domain names. EPP is a protocol designed for allocating objects within registries over the Internet. The EPP protocol is based on Extensible Markup Language ("XML"), which is a structured, text-based format. The underlying network transport is not fixed, although the currently specified method is over TCP.

Drop catching deleting domain names has been common with the .COM and .NET TLDs for many years, and the drop catching is becoming more and more common across additional TLDs like .CC and .TV. Drop catching consists of registrars that are competing for deleting domain names by sending a large volume of "domain creates" to the domain name registry at the time of the delete/purge of the domain name. Domain names that enter the final phase of the Redemption Grace Period (RGP) are typically deleted at a specific time in a specific order. Registrars that offer their registrants the ability to register (catch) deleting domain names, will compete based on the number of concurrent create commands they can send at the calculated time of the domain name deletion. The drop catching can cause extreme load on the domain registry application services as well as the domain registry database.

Thus, a heretofore unaddressed need exists in the industry to address the aforementioned deficiencies and inadequacies.

SUMMARY

According to examples of the present disclosure, a system for dynamically allocating domain name acquisition resources is provided. The system comprises a processing system of a device comprising one or more processors; and a memory system comprising one or more computer-readable media, wherein the one or more computer-readable media contain instructions that, when executed by the processing system, cause the processing system to perform a method comprising: obtaining, at a database, a list of domain names that are to be deleted during a first time window; updating a drop catch table in the database based on a batch process, wherein the drop catch table comprises a second list of domain names that are to be deleted; refreshing a first cache in a first application server that provides domain name system services based on the drop catch table; obtaining, at the first application server, an extensible provisioning protocol (EPP) command from a first registrar to register a domain name from the drop catch table that is about to be deleted during a second time window; determining, based on the first cache, that the domain name to be registered is available to be registered; updating an availability flag for the domain name in the first cache indicating that the domain name is registered; and providing an acknowledgment to the first registrar that the domain name has been registered.

In some examples, the determining that the domain name is available to be registered, further comprises determining that the availability flag is set to yes.

In some examples, the first time window is about 1 to about 2 hours before the second time window.

In some examples, the refreshing the first cache occurs in time intervals of about 2 seconds.

In some examples, the method further comprising updating the drop catch table based on the domain name that is registered.

In some examples, the first cache is configured to store premium domain names.

In some examples, the method further comprises determining that the domain name to be registered is not a premium domain name; determining, based on a second cache, that the domain name to be registered is available to be registered; and updating an availability flag for the domain name in the second cache indicating that the domain name is registered.

According to examples of the present disclosure, a method for dynamically allocating domain name acquisition resources is provided. The method comprises obtaining, at a database, a list of domain name that are to be deleted during a first time window; updating a drop catch table in the database, wherein the drop catch table comprises a second list of domain names that are to be deleted; refreshing a first cache in a first application server that provides domain name system services based on the drop catch table; obtaining, at the first application server, an extensible provisioning protocol (EPP) command from a first registrar to register a domain name from the drop catch table that is about to be deleted during a second time window; determining, based on the first cache, that the domain name to be registered is available to be registered; updating an availability flag for the domain name in the first cache indicating that the domain name is registered; and providing an acknowledgment to the first registrar that the domain name has been registered.

In some examples, the determining that the domain name is available to be registered, further comprises determining that the availability flag is set to yes.

In some examples, the first time window is about 1 to about 2 hours before the second time window.

In some examples, the refreshing the first cache occurs in time intervals of about 2 seconds.

In some examples, the method further comprises updating the drop catch table based on the domain name that is registered.

In some examples, the first cache is configured to store premium domain names.

In some examples, the method further comprises determining that the domain name to be registered is not a premium domain name; determining, based on a second cache, that the domain name to be registered is available to be registered; and updating an availability flag for the domain name in the second cache indicating that the domain name is registered.

According to examples of the present disclosure, a system for dynamically allocating domain name acquisition resources is provided. The system comprises a processing system of a device comprising one or more processors; and a memory system comprising one or more computer-readable media, wherein the one or more computer-readable media contain instructions that, when executed by the processing system, cause the processing system to perform operations comprising: obtaining, at a database, a first list of domain names that are to be deleted during a first time window; updating a drop catch table in the database, wherein the drop catch table comprises a second list of domain names that are to be deleted; refreshing a first cache in a first application server that provides domain name system services based on the drop catch table; obtaining, at the first application server, an extensible provisioning protocol (EPP) command from a first registrar to register a domain name from the drop catch table that is about to be deleted during a second time window; determining, based on the first cache, that the domain name to be registered is not available to be registered; and providing a response to the first registrar that the domain name is not available to be registered.

According to examples of the present disclosure, a system for dynamically allocating domain name acquisition resources is provided. The system comprises a first application server configured to provide domain name system (DNS) services based on a first network policy, the first application server comprising a first cache; a second application server configured to provide DNS services based on a second network policy, the second application server comprising a second cache; and a database, in communication with the first application server and the second application server, the database storing a domain name table that stores domain names that are scheduled to be deleted, wherein the database is periodically updated with domain names that are to be deleted.

In some examples, the first network policy comprises a first availability policy for catching domain names for a first set of registrars and the second network policy comprises a second availability policy for catching domain names for a second set of registrars, wherein the first availability policy allows drop catch domain names to be available for registration immediately and the second availability policy imposes a time delay for registration of drop catch domain names.

In some examples, the first cache, the second cache, or both are refreshed from the database at a rate of about 1 to about 2 seconds.

It is to be understood that both the foregoing general description and the following detailed description are exemplary and explanatory only and are not restrictive of the implementations, as claimed.

DETAILED DESCRIPTION

Figure 1:
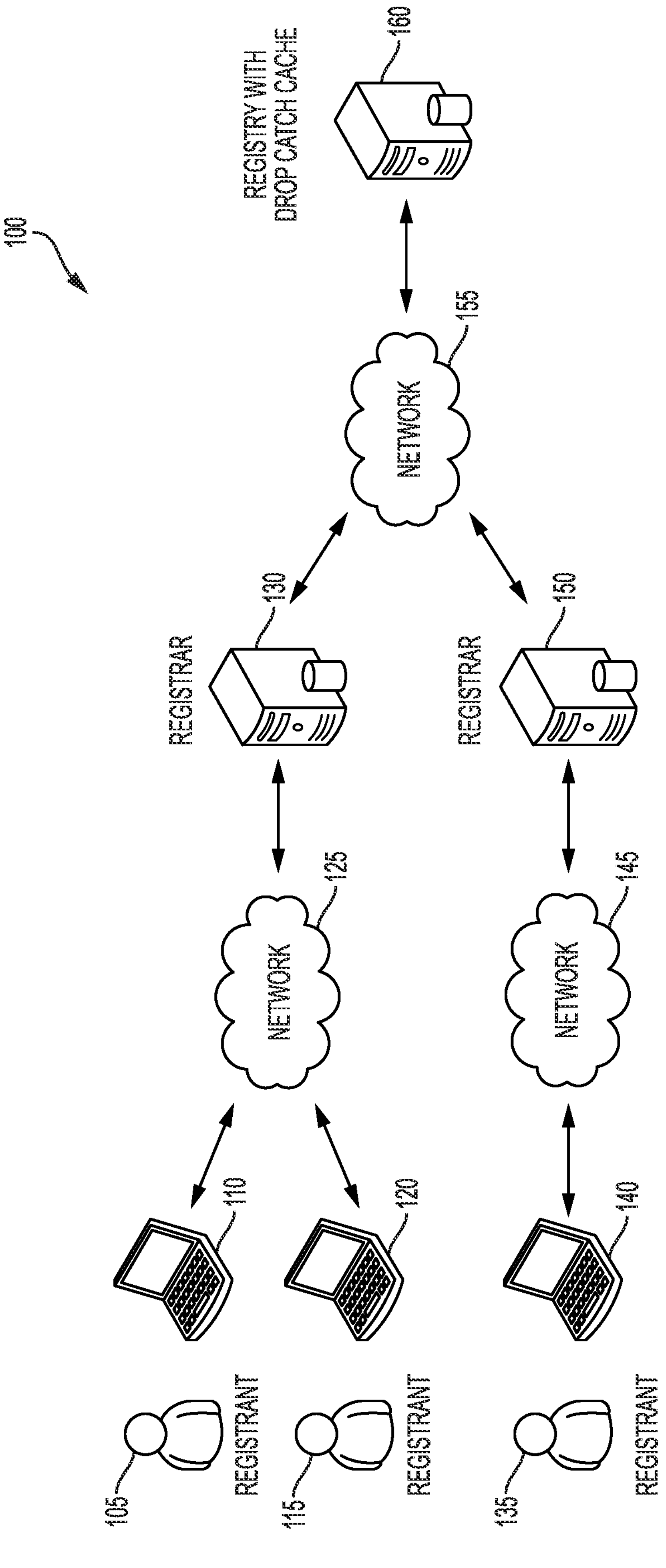
FIG. 1 is a diagram illustrating an example DNS using a drop catch cache according to examples of the present disclosure.

Reference will now be made in detail to example implementations, which are illustrated in the accompanying drawings. When appropriate, the same reference numbers are used throughout the drawings to refer to the same or like parts.

For simplicity and illustrative purposes, the principles of the present disclosure are described by referring mainly to exemplary implementations thereof. However, one of ordinary skill in the art would readily recognize that the same principles are equally applicable to, and can be implemented in, all types of information and systems, and that any such variations do not depart from the true spirit and scope of the present disclosure. Moreover, in the following detailed description, references are made to the accompanying figures, which illustrate specific exemplary implementations. Electrical, mechanical, logical and structural changes may be made to the exemplary implementations without departing from the spirit and scope of the present disclosure. The following detailed description is, therefore, not to be taken in a limiting sense and the scope of the present disclosure is defined by the appended claims and their equivalents.

An authoritative domain name registry responsible for registering and resolving domain names associated with one or more TLDs can perform "domain drops" to release dropping domain names associated with the TLDs. In the context of this disclosure, dropped domain names are deleted domain names that are scheduled to be purged from a registry domain name database. In one example that is consistent with RFC 3915, a registrar could submit a delete 10 days after the registration before the expiration date and it would go through the redemption grace period (RGP) process flow that will purge the domain name from the database making it available for re-registration after 35 days. There are 30 days (redemptionPeriod) in RGP where a domain name can be restored, followed by 5 days (pendingDelete) when the domain name will be purged at the end of the 5 days. The time periods described above are merely exemplary and can vary by hours or days. Such domain drops can happen on a regular basis (e.g., daily at 2 PM Eastern Time) and can cause intense competition between domain name registrars, which can number in the hundreds or even thousands depending on the number of "shell" registrar accreditation that could be setup to compete in the pool, to obtain certain dropping domain names. The registrars can make acquisition requests to obtain the dropping domain names within milliseconds of being dropped, with some acquisition requests failing because the dropping domain names have yet to be released (e.g., too early) or have been obtained by other registrars (e.g., too late). The number of acquisition requests, e.g., create commands, can number in the millions to catch those dropping domain names, where a high percentage of them being a failed create command. End-users (e.g., domainers, domain snipers, etc.) can contract services that attempt to obtain domain names on their behalf. These services can include the registrars directly or "drop-catch" services that leverage an undisclosed network of registrars to attempt domain name acquisition. For example, a registrar can spin off one or more subsidiary registrars to create such a network of registrars to improve their odds of obtaining dropping domain names.

Generally speaking, examples of the present disclosure address problems of the conventional approach by decreasing the load on the registry database with a targeted drop catching cache, and address the cheating by registrars by making the cache pool aware and incorporating a pool availability policy. As used herein, a pool is a set of computing resources in communication with a common database and with one or more network access points for communication with one or more registrars. For example, a network access point can have VIP access, i.e., allocated access, to a set of registrars during the drop catch period. Examples of the present disclosure provides support for drop catching by including a drop catch cache, which supports drop catching activity without impacting the underlying domain registry database, and including a drop catch cache that supports multiple network pools, each network pool with a respective deleting domain availability policy. In this disclosure, the network pool aware cache is called the drop catch pool cache. By supporting independent availability policies, drop catching registrars will not be able to (or will be minimize) cheating by utilizing a different pool, such as a pool that is not setup to support drop catching. Combining a drop catch cache with a pool-aware availability policy can reduce the impact on the domain registry database and will focus the drop catching activity to a network pool that is setup to handle it. A drop catch cache with the ability to control a delayed availability of a separate drop catching pool (a batch pool or an auto pool) with the use of a drop catching cache allows for a more efficient handling of the drop catch load without directly impacting the domain registry database.

The typical approach in handling drop catching is to support a domain create command as normal, which means a drop catching domain create command will be provided to the database for each and every command. A drop catching domain create command that results in a failure due to the domain being unavailable is referred to as a failed add. By incorporating a drop catch cache, the application tier can mitigate the computing resources consumed by the failed domain name add commands, which represent the bulk of the transactions and thus reducing the load on the registry database.

Even if the application tier and the database are configured to handle the drop catching load, eventually the bottleneck will move up to the network layer, where the maximum bandwidth or maximum transaction rate is hit. The bottleneck will impact both drop catching registrars and non-drop catching registrars. To mitigate drop catching impacting non-drop catching registrars, a separate network pool is setup. The drop catch network pool is typically called a batch pool. The pool that is meant for non-drop catching activity is referred to as the regular pool. Drop catching registrars are asked to execute drop catching in the batch pool, but nothing typically will stop them by cheating and using the regular pool for drop catching. To mitigate this, the deleting domain availability can be delayed in the regular pool which will cause the drop catching registrars to not bother using the regular pool. This delay can be handled by sleeping when a request is made for a dropping domain name, but that will hold up a thread resource. Another approach is to leverage the drop catch cache to be pool aware and control the availability of the dropping domain names, which is referred to as a drop catch pool cache. The drop catch pool cache can support many network pools, each with its own availability policy. Thus, by combining the efficiencies of a drop catching cache to reduce the database load with being pool aware with configurable availability policies, a flexible architecture is provided for efficiently handling drop catching activity that mitigates cheating.

The drop catch cache loads the list of dropping domain names along with the availability flag into a cache within the application tier. The delete batch will delete the domains and mark the record in the drop catch table as available. The caches will refresh (e.g. every 2 seconds) with the available flag set to true, which the next domain create command will pass through the cache to the database. The cache availability flag is locally updated to false to the limit the load on the database even further. The key is that the delete batch is in control and signals the availability of a deleted domain name. The drop catch cache will short circuit all create requests for a deleting domain name.

The drop catch pool cache extends the drop catch cache to include an availability time per pool instead of just a flag in the drop catch cache. This enables the delete batch to specify when a deleted domain name is available within each defined network pool. The delay in the regular pool would be driven by the delete batch setting a later availability timestamp for the regular pool.

A batch pool will allow for direct drop catching activity away from the regular pool to the batch pool, which will enable the regular pool to consistently meet its availability and performance service level agreement (SLA) and operational level agreement (OLA), and remove all drop catching activity in the regular pool by delaying the availability of deleting names in the regular pool.

FIG. 1 is a diagram 100 illustrating an example DNS using a drop catch cache according to examples of the present disclosure. Registrants 105, 115 via a respective client device 110, 120, communicates with a registrar 130 via a network 125 to register a domain name or modify properties associated with an existing domain name. Similarly, registrant 135, via client device 140, communicates with registrar 150 via a network 145. Registrars 130, 150 can communicate with a registry with a drop catch cache 160 using EPP commands, discussed further below, via a network 155.

Networks 125, 145, and 155 can represent any type of one or more wired and/or wireless telecommunications networks. For example, networks 125, 145, and 155 can represent the Internet and/or one or more telephone networks, one or more cellular networks, one or more LANs, etc. In some implementations, client devices 110, 120, 140 can by any type of computing device that can communicate with the registrar 130, 150.

In some examples, the registry with the drop catch cache 160 can represent one or more computing devices. For example, the registry with the drop catch cache 160 can represent one or more database servers, web servers, mainframe computers, etc. used to provide a domain name registry service. In some examples, the registry with the drop catch cache 160 can maintain an up-to-date database of domain name records. Accordingly, the registry with the drop catch cache 160 can receive domain name requests and provide responses (e.g., name servers, statuses). In further examples, the registry with the drop catch cache 160 can delete dropping domain name records and register new domain names when no record exists for a domain name in an add request.

In some examples, the registrars 130 and 150 can each represent one or more computing devices. For example, the registrars 130 and 150 can represent database servers, web servers, mainframe computers, etc. used to provide domain name registrar services. In some examples, a registrar can be accredited by a registry (e.g., the registry with the drop catch cache 160) and/or ICANN to manage the reservation of domain names with the registry. Accordingly, a registrar can receive requests to register domain names from end users (e.g., registrant 105, 115, 135), and send add requests to the registry to attempt to register the domain names. Additionally, in some examples, the registrars 130 and 150 can offer a service of registering newly deleted domain names and/or offer wait list servers for existing domains that may be deleted in the future. Accordingly, when end users request an expiring domain name, the registrars 130 and 150 can send repeated add requests to the registry with the drop catch cache 160 in an attempt to catch the domain name. The registrars 130 and 150 can batch the drop catching activity, which leads to an asynchronous relationship between the registrars 130 and 150 and the registrant 105, 115, and 135.

The schematic depicted in FIG. 1 is merely for the purpose of illustration and is not intended to be limiting. Further, the DNS depicted is merely a simplified example of a DNS, consistent with certain disclosed examples, but such an example is not intended to be limiting. For example, the DNS can include additional networks, servers, computers, registries, registrars, resource allocation servers, and/or other devices. Additionally, the described devices can be separate devices, as pictured, or various devices can be combined, consistent with certain disclosed embodiments.

Figure 2:
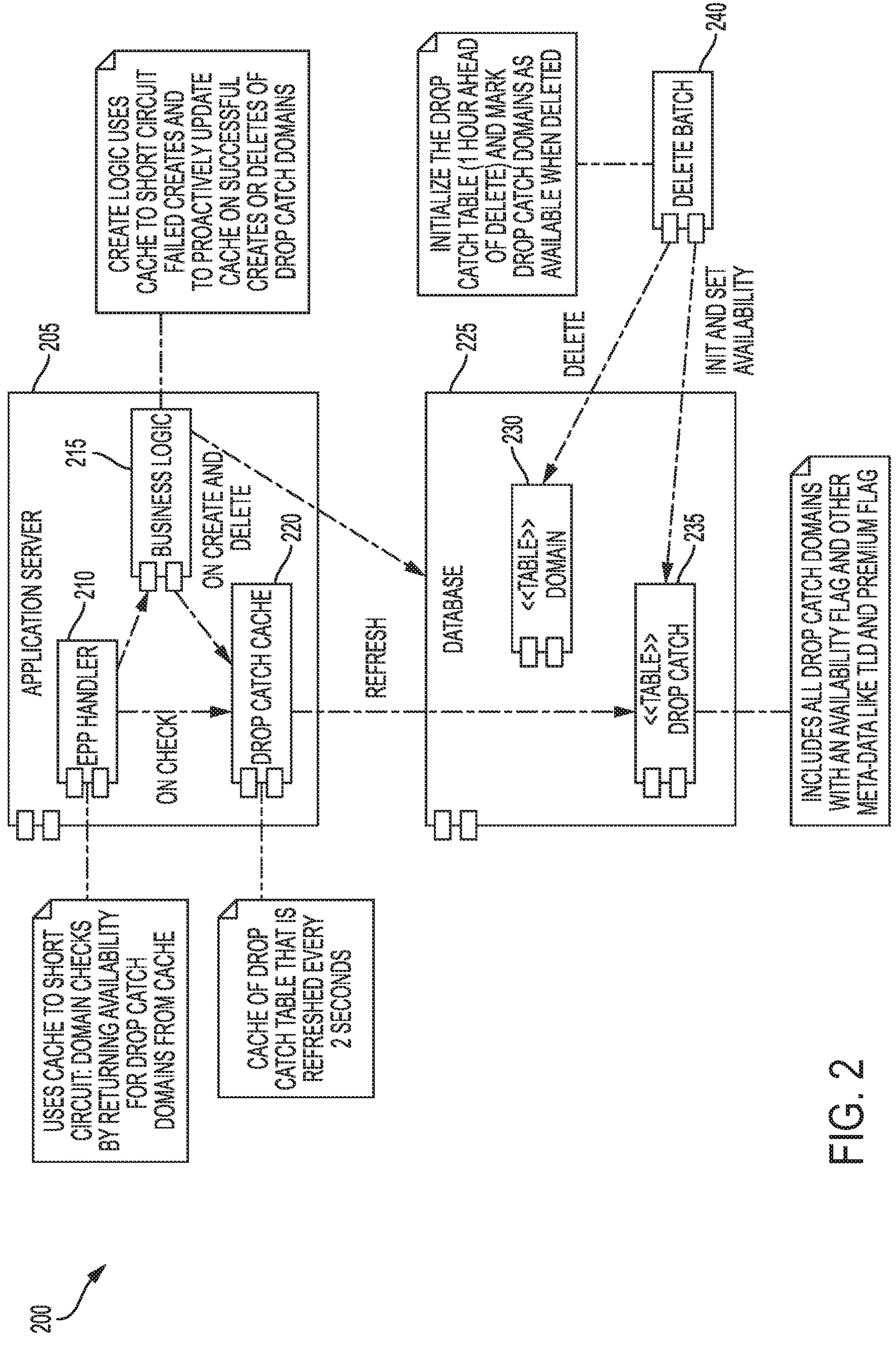
FIG. 2 shows a diagram of an application server for a registry using a drop catch cache, according to examples of the present disclosure.

FIG. 2 shows a diagram 200 of an application server for a registry using a drop catch cache, according to examples of the present disclosure. An application server 205 comprises an EPP handler 210, a business logic 215, and a drop catch cache 220. In some examples, the application server 205 can operate in a multithreaded environment. The application server 205 is in communication with a database 225 that includes a domain table 230 and a list of drop catching domain list 235 stored as a table in the database 225, which are both updated by a delete batch process 240. The domain table 230 stores the availability status of domains that are handled by the drop catch cache 220. The delete batch process 240 is a process that adds all the domains that are to be deleted by a delete pending batch to the domain table 230. The delete batch process 240 can execute a before, i.e., 1 or 2 hours before, the delete batch process 240 executes, e.g., the drop catching domains being deleted, and sets availability as 'N' for the domains.

A registrar (not shown) communicates EPP commands with the application server 205 via the EEP handler 210. The drop catch cache 220 is driven by the drop catch table 235 in the database 225. The delete batch process 240 starts before, i.e., 1 or 2 hours before, the deleting of the drop catching domains and initializes the drop catching domain list 235 ahead, i.e., 1 or 2 hours before, of the deleting of the drop catching domains. The drop catch cache 220 is loaded with domains from domain table 230 about an hour prior to execution of the delete batch process 240. The drop catch cache 220 refreshes, i.e., every 1 or 2 seconds, the drop catching domain list 235 and availability from the drop catch table around (specific time window) the drop catching window. During a time period that dropped domains can be registered, the drop catch cache 220 can process check/create commands for a dropping domain names. If a domain is not available, the drop catch cache 220 can provide an unavailable status and the query will not reach the database 225. When the delete batch process 240 deletes a drop catching domain, it will mark the availability flag with a "Y" of the domain in the drop catching domain list 235. Within a period of time, e.g., up to 2 seconds maximum, the availability flag "Y" will update in the drop catch cache 220. Once the drop catch cache 220 gets updated with the availability flag "Y", the first request will go through regular domain create flow and domain then gets registered and the domain availability flag in the domain table 230 is set to "N." After the drop catch cache 220 is updated, future queries will get a reply from the drop catch cache 220. During the time period that dropped domains can be registered, if a created domain gets deleted, then the delete flow will update the drop catching domain list 235 and mark the availability flag as "Y," and this status will be reflected in the drop catch cache 220 with a period of time, i.e., about 1 or 2 seconds.

For dropping domain names, the application server 205 uses the drop catch cache 220 instead of the database 225 with an EPP domain check command or an EPP create domain command. This ensures that for checks and failed adds the application server 205 can respond without querying the database 225. Additionally, the business logic 215 can be used to proactively update the drop catch cache 220 when a domain is successfully created or when a drop catching domain is deleted by the registrar. It should be noted that the application servers may refresh at different intervals, so the availability of a drop catching domain name will not be synchronized across all application servers, but all registrars have an equivalent chance in getting a drop catching domain name based on the randomization in load balancing connections across the application servers. The application servers may utilize a clustered or common cache that is synchronized across all applications servers.

In some examples, the drop catching domain list 235 can be a table that holds all the domains that are to be deleted by the delete batch process 240 and includes the following columns: name, bundleid, available, premium_flag, updateddate, createddate, and updatedby.

In one example, the time period that dropped domains can be registered can being around 1 hour prior to the time that the delete batch executes, which can be set to execute at 3:00 AM. The time period that the dropped domain can be registered can end around 1 to 2 hours after the delete batch executes, such as at 5:00 AM. After deleting non-premium domain names in the delete batch, the drop catching domain list 235 is updated by setting an available flag to 'Y' for those non-premium domain names that were deleted. Similarly, for premium domain names, an available flag is set to 'Y" in the drop catching domain list 235 for those premium domain names that were deleted.

In a multithreading example, a manager thread can operate at a 15 minute frequency and a worker thread can operate at a 1-5 second frequency. The worker thread can populate the drop catch cache 220 from the delete batch process 240 using a first HashMap that contains all the domains, including both premium and non-premium domain names, that belong to a particular group and a second HashMap that contains all the premium domain names in another particular group. For every worker thread interval, i.e., every 2-5 seconds, the worker thread can reload the entire cache, i.e., domainname and availability flag, of its group in a new HashMap and switch the old HashMap to a new HashMap.

Figure 3:
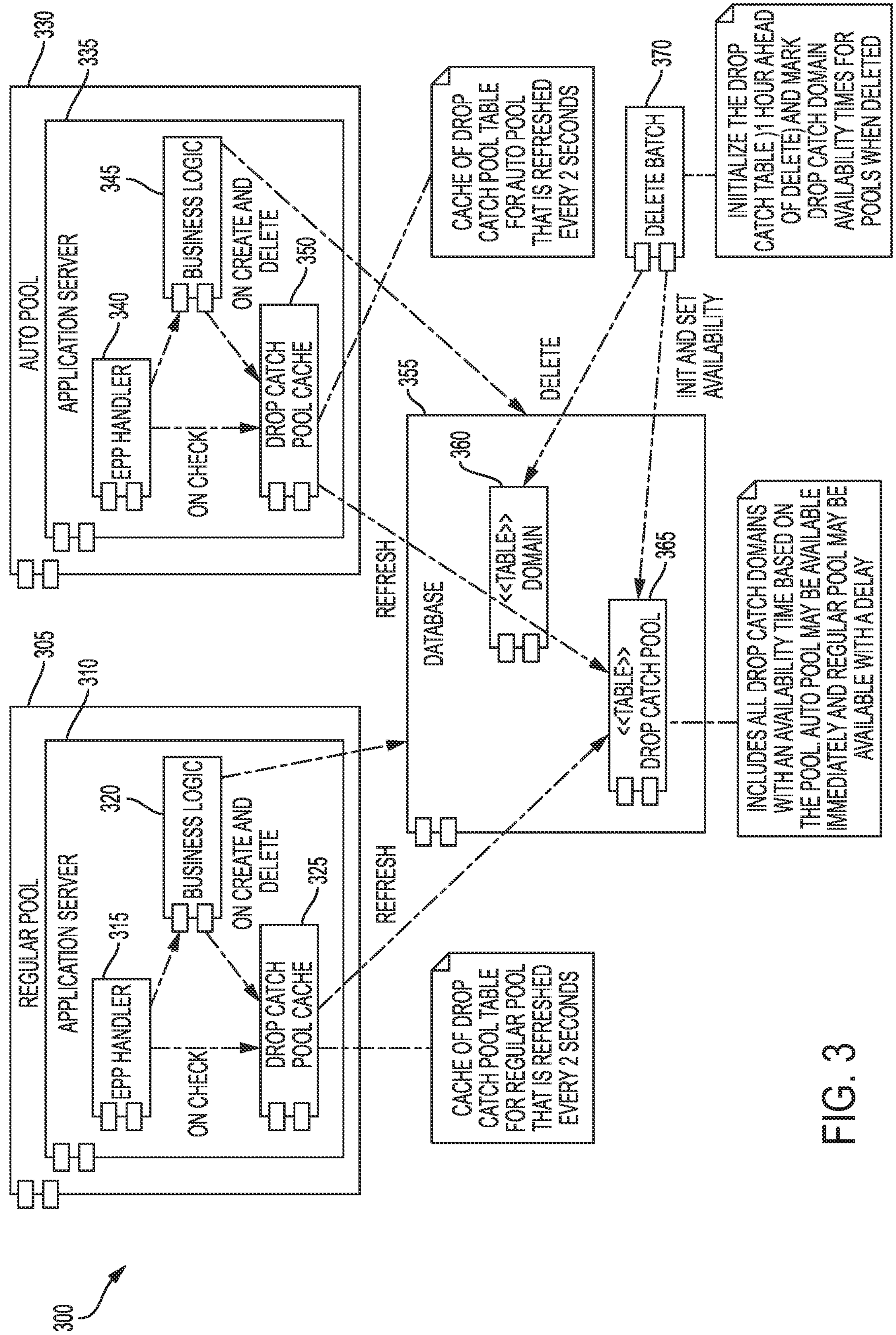
FIG. 3 depicts a component diagram showing the drop catch pool cache with the regular pool and the auto (batch) pool, according to examples of the present disclosure.

In some examples, the drop catch cache 220 can be extended to be aware of the network pools (regular pool and batch/auto pools), which are called the drop catch pool cache. FIG. 3 depicts a component diagram 300 showing the drop catch pool cache with the regular pool and the auto (batch) pool, according to examples of the present disclosure. The regular pool 305 comprises an application server 310, which includes an EPP handler 315, a business logic 320, and a drop catch pool cache 325. The auto pool 330 comprises an application server 335, which includes an EPP handler 340, a business logic 345, and a drop catch pool cache 350. The drop catch pool cache 325, based on a policy in the business logic 320, communicates with a database 355. Likewise, the drop catch pool cache 350, based on a policy in the business logic 345, communicates with the database 355. The database 355 comprises a domain table 360 and a drop catch pool 365, which is updated by a delete batch process 370.

The drop catch pool cache 325, 350 extends the drop catch cache 220 by being aware of the network pool (the regular pool 305 and the auto pool 330) and being capable of having different availability policies for drop catching domains by pool stored in the business logic 320, 345, respectively. For example, a delay of availability can be provided based on a policy rule in the business logic 320 in the regular pool 305 to remove all drop catching activity in the regular pool 305. The delete batch does more than mark a drop catching domain as available or unavailable, but will set the availability time of a drop catching for the known pools. With only two pools, a single availability timestamp can be set that only applies to the regular pool 305. Another approach is to have the delete batch explicitly set the available timestamp per pool (e.g. the regular pool 305 and the auto pool 330). The application servers 310, 335 know what pool they belong to and will load the appropriate drop catch pool information into their drop catch pool cache 325, 350. This means that different pools can have a different list of drop catching domains names along with a different set of availability attributes.

Figure 4:
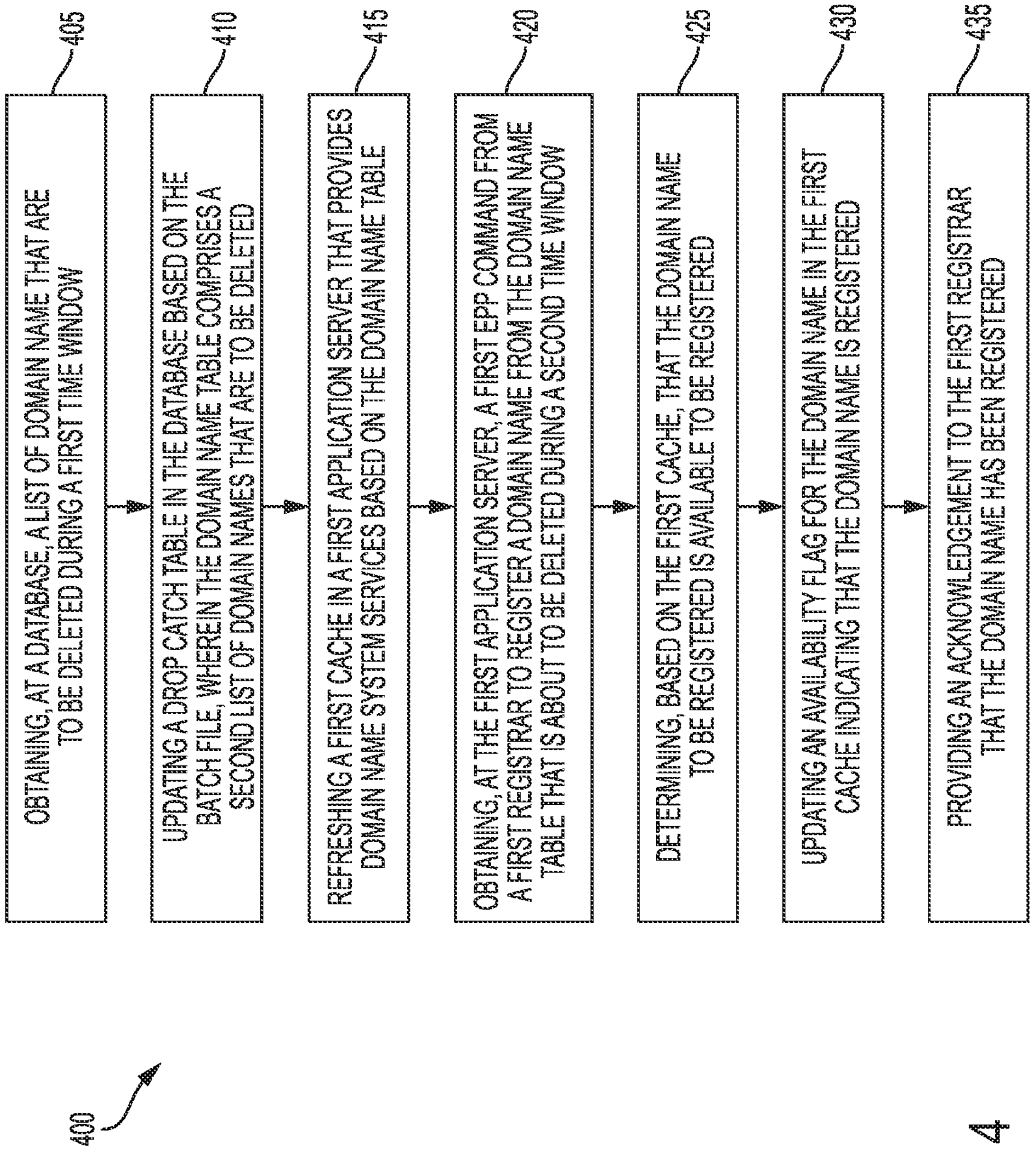
FIG. 4 shows a method for DNS using a drop catch cache, according to examples of the present disclosure.

FIG. 4 shows a method for dynamically allocating domain name acquisition resources 400, according to examples of the present disclosure. At 405, the method begins by obtaining, at a database, a list of domain names that are to be deleted during a first time window. At 410, the method continues by updating a drop catch table in the database based on the batch process, wherein the domain name table comprises a second list of domain names that are to be deleted. At 415, the method continues by refreshing a first cache in a first application server that provides domain name system services based on the domain name table. In some examples, the first cache refreshed rate is about every 2 second. In some examples, the first cache can store premium domain names. At 420, the method continues by obtaining, at the first application server, a first EPP command from a first registrar to register a domain name from the domain name table that is about to be deleted during a second time window. In some examples, the first time window is about 1 to 2 hours before the second time window. At 425, the method continues by determining, based on the first cache, that the domain name to be registered is available or not available to be registered. If the domain name is not available, the registration request will return to the first registrar a failure without transacting with the database. If the domain name is available, at 430, the method continues by updating an availability flag for the domain name in the first cache indicating that the domain name is registered. At 435, the method concludes by providing an acknowledgment to the first registrar that the domain name has be registered. In some examples the domain name table can be updated based on the domain name that is registered.

In some examples the method for dynamically allocating domain name acquisition resources 400 can further comprise determining that the domain name to be registered is not a premium domain name; determining, based on a second cache, that the domain name to be registered is available to be registered; and updating an availability flag for the domain name in the second cache indicating that the domain name is registered.

Figure 5:
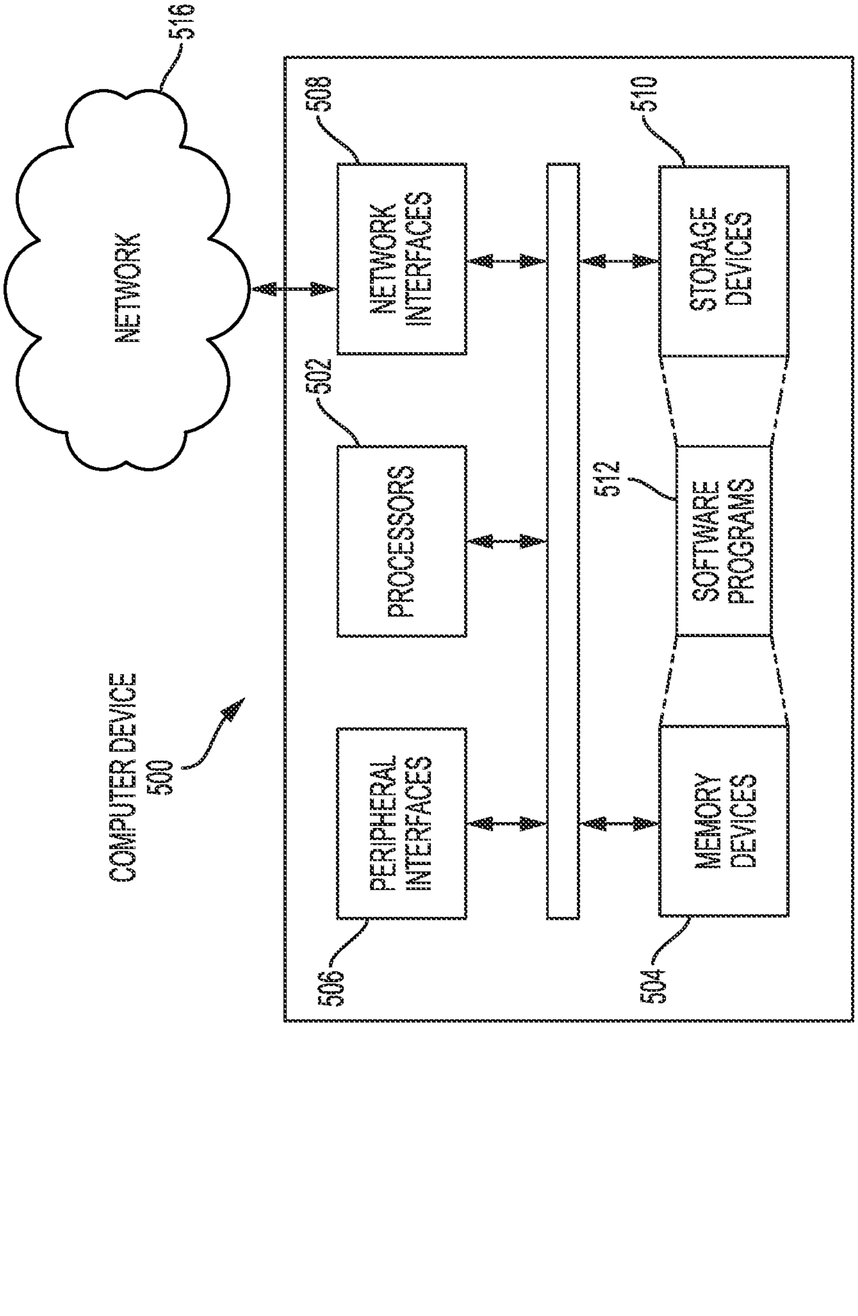
FIG. 5 is an example computer system for performing the disclosed implementations, consistent with the present disclosure.

FIG. 5 illustrates an example of a hardware configuration for a computer device 500 that can be used as mobile device or server, which can be used to perform one or more of the processes described above. While FIG. 5 illustrates various components contained in the computer device 500, FIG. 5 illustrates one example of a computer device and additional components can be added and existing components can be removed.

The computer device 500 can be any type of computer devices, such as desktops, laptops, servers, DNS server, etc., or mobile devices, such as smart telephones, tablet computers, cellular telephones, personal digital assistants, etc. As illustrated in FIG. 5, the computer device 500 can include one or more processors 502 of varying core configurations and clock frequencies. The computer device 500 can also include one or more memory devices 504 that serve as a main memory during the operation of the computer device 500. For example, during operation, a copy of the software that supports the DNS operations can be stored in the one or more memory devices 504. The computer device 500 can also include one or more peripheral interfaces 506, such as keyboards, mice, touchpads, computer screens, touch-screens, etc., for enabling human interaction with and manipulation of the computer device 500.

The computer device 500 can also include one or more network interfaces 508 for communicating via one or more networks, such as Ethernet adapters, wireless transceivers, or serial network components, for communicating over wired or wireless media using protocols. The computer device 500 can also include one or more storage device 510 of varying physical dimensions and storage capacities, such as flash drives, hard drives, random access memory, etc., for storing data, such as images, files, and program instructions for execution by the one or more processors 502.

Additionally, the computer device 500 can include one or more software programs 512 that enable the functionality described above. The one or more software programs 512 can include instructions that cause the one or more processors 502 to perform the processes described herein. Copies of the one or more software programs 512 can be stored in the one or more memory devices 504 and/or on in the one or more storage devices 510. Likewise, the data used by one or more software programs 512 can be stored in the one or more memory devices 504 and/or on in the one or more storage devices 510.

In implementations, the computer device 500 can communicate with other devices via a network 516. The other devices can be any types of devices as described above. The network 516 can be any type of electronic network, such as a local area network, a wide-area network, a virtual private network, the Internet, an intranet, an extranet, a public switched telephone network, an infrared network, a wireless network, and any combination thereof. The network 516 can support communications using any of a variety of commercially-available protocols, such as TCP/IP, UDP, OSI, FTP, UPnP, NFS, CIFS, AppleTalk, and the like. The network 516 can be, for example, a local area network, a wide-area network, a virtual private network, the Internet, an intranet, an extranet, a public switched telephone network, an infrared network, a wireless network, and any combination thereof.

The computer device 500 can include a variety of data stores and other memory and storage media as discussed above. These can reside in a variety of locations, such as on a storage medium local to (and/or resident in) one or more of the computers or remote from any or all of the computers across the network. In some implementations, information can reside in a storage-area network ("SAN") familiar to those skilled in the art. Similarly, any necessary files for performing the functions attributed to the computers, servers, or other network devices may be stored locally and/or remotely, as appropriate.

In implementations, the components of the computer device 500 as described above need not be enclosed within a single enclosure or even located in close proximity to one another. Those skilled in the art will appreciate that the above-described componentry are examples only, as the computer device 500 can include any type of hardware componentry, including any necessary accompanying firmware or software, for performing the disclosed implementations. The computer device 500 can also be implemented in part or in whole by electronic circuit components or processors, such as application-specific integrated circuits (ASICs) or field-programmable gate arrays (FPGAs).

If implemented in software, the functions can be stored on or transmitted over a computer-readable medium as one or more instructions or code. Computer-readable media includes both tangible, non-transitory computer storage media and communication media including any medium that facilitates transfer of a computer program from one place to another. A storage media can be any available tangible, non-transitory media that can be accessed by a computer. By way of example, and not limitation, such tangible, non-transitory computer-readable media can comprise RAM, ROM, flash memory, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes CD, laser disc, optical disc, DVD, floppy disk and Blu-ray disc where disks usually reproduce data magnetically, while discs reproduce data optically with lasers. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Combinations of the above should also be included within the scope of computer-readable media.

The foregoing description is illustrative, and variations in configuration and implementation can occur to persons skilled in the art. For instance, the various illustrative logics, logical blocks, modules, and circuits described in connection with the embodiments disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but, in the alternative, the processor can be any conventional processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other such configuration.

In one or more exemplary embodiments, the functions described can be implemented in hardware, software, firmware, or any combination thereof. For a software implementation, the techniques described herein can be implemented with modules (e.g., procedures, functions, subprograms, programs, routines, subroutines, modules, software packages, classes, and so on) that perform the functions described herein. A module can be coupled to another module or a hardware circuit by passing and/or receiving information, data, arguments, parameters, or memory contents. Information, arguments, parameters, data, or the like can be passed, forwarded, or transmitted using any suitable means including memory sharing, message passing, token passing, network transmission, and the like. The software codes can be stored in memory units and executed by processors. The memory unit can be implemented within the processor or external to the processor, in which case it can be communicatively coupled to the processor via various means as is known in the art.

While the teachings have been described with reference to examples of the implementations thereof, those skilled in the art will be able to make various modifications to the described implementations without departing from the true spirit and scope. The terms and descriptions used herein are set forth by way of illustration only and are not meant as limitations. In particular, although the processes have been described by examples, the stages of the processes can be performed in a different order than illustrated or simultaneously. Furthermore, to the extent that the terms "including", "includes", "having", "has", "with", or variants thereof are used in the detailed description, such terms are intended to be inclusive in a manner similar to the term "comprising." As used herein, the terms "one or more of" and "at least one of" with respect to a listing of items such as, for example, A and B, means A alone, B alone, or A and B. Further, unless specified otherwise, the term "set" should be interpreted as "one or more." Also, the term "couple" or "couples" is intended to mean either an indirect or direct connection. Thus, if a first device couples to a second device, that connection can be through a direct connection, or through an indirect connection via other devices, components, and connections.

Those skilled in the art will be able to make various modifications to the described embodiments without departing from the true spirit and scope. The terms and descriptions used herein are set forth by way of illustration only and are not meant as limitations. In particular, although the method has been described by examples, the steps of the method can be performed in a different order than illustrated or simultaneously. Those skilled in the art will recognize that these and other variations are possible within the spirit and scope as defined in the following claims and their equivalents.

The foregoing description of the disclosure, along with its associated embodiments, has been presented for purposes of illustration only. It is not exhaustive and does not limit the disclosure to the precise form disclosed. Those skilled in the art will appreciate from the foregoing description that modifications and variations are possible in light of the above teachings or may be acquired from practicing the disclosure. For example, the steps described need not be performed in the same sequence discussed or with the same degree of separation. Likewise various steps may be omitted, repeated, or combined, as necessary, to achieve the same or similar objectives. Similarly, the systems described need not necessarily include all parts described in the embodiments, and may also include other parts not describe in the embodiments.

Accordingly, the disclosure is not limited to the above-described embodiments, but instead is defined by the appended claims in light of their full scope of equivalents.

What is claimed is:

1. A system for decreasing load on a registry database, comprising:

the registry database;

an application server configured to provide domain name services;

a processing system of a device comprising one or more processors; and a memory system comprising one or more computer-readable media, wherein the one or more computer-readable media contain instructions that, when executed by the processing system, cause the processing system to perform operations comprising:

configuring, at the registry database, a drop catch cache in the application server to support a plurality of network pools;

loading, to the drop catch cache, a first set of domain names that are to be deleted from the registry database during a first time window;

deleting, based on the first time window, the first set of domain names from the registry database;

refreshing the drop catch cache with an available flag set to true; and removing, based on the drop catch cache, requests for deleting domain names, wherein the registry database comprises a second set of domain names that are to be deleted during a second time window and availability information regarding the domain names that are to be deleted during the second time window, wherein the first set is separate from the second set.

2. The system of claim 1, wherein the plurality of network pools comprises at least one of a batch pool or an auto pool.

3. The system of claim 1, wherein each network pool of the plurality of network pools has an independent availability policy.

4. The system of claim 1, wherein the drop catch cache is a drop catch pool cache and provides availability of the first and second set of domain names.

5. The system of claim 1, wherein the drop catch cache extends the drop catch cache to enable a delete batch to specify when a deleted domain name is available.

6. The system of claim 5, wherein the drop catch cache is able to control a delayed availability of a regular pool.

7. The system of claim 1, wherein the first time window is 1 to 2 hours before the second time window.

8. A computer-implemented method for decreasing load on a registry database, comprising:

configuring, at the registry database, a drop catch cache supporting a plurality of network pools;

loading, to the drop catch cache, a first set of domain names that are to be deleted from the registry database during a first time window;

deleting, based on the first time window, the first set of domain names from the registry database;

refreshing the drop catch cache with an available flag set to true; and removing, based on the drop catch cache, requests for deleting domain names, wherein the registry database comprises a second set of domain names that are to be deleted during a second time window and availability information regarding the domain names that are to be deleted during the second time window, wherein the first set is separate from the second set.

9. The computer-implemented method of claim 8, wherein the plurality of network pools comprises at least one of a batch pool or an auto pool.

10. The computer-implemented method of claim 8, wherein each network pool of the plurality of network pools has an independent availability policy.

11. The computer-implemented method of claim 8, wherein the drop catch cache is a drop catch pool cache and provides availability of the first and second sets of domain names.

12. The computer-implemented method of claim 8, wherein the drop catch cache extends the drop catch cache to enable a delete batch to specify when a deleted domain name is available.

13. The computer-implemented method of claim 12, wherein the drop catch cache is able to control a delayed availability of a regular pool.

14. The computer-implemented method of claim 8, wherein the first time window is 1 to 2 hours before the second time window.

15. A non-transitory computer readable media having stored thereon instructions for execution by a computing device, which when executed cause the computing device to implement the steps of:

configuring, at a registry database, a drop catch cache supporting a plurality of network pools;

loading, to the drop catch cache, a first set of domain names that are to be deleted from the registry database during a first time window;

deleting, based on the first time window, the first set of domain names from the registry database;

refreshing the drop catch cache with an available flag set to true; and removing, based on the drop catch cache, requests for deleting domain names, wherein the registry database comprises a second set of domain names that are to be deleted during a second time window and availability information regarding the domain names that are to be deleted during the second time window, wherein the first set is separate from the second set.

16. The non-transitory computer readable media of claim 15, wherein the plurality of network pools comprises at least one of a batch pool or an auto pool.

17. The non-transitory computer readable media of claim 15, wherein each network pool of the plurality of network pools has an independent availability policy.

18. The non-transitory computer readable media of claim 15, wherein the drop catch cache is a drop catch pool cache and provides availability of the first and second sets of domain names.

19. The non-transitory computer readable media of claim 15, wherein the drop catch cache extends the drop catch cache to enable a delete batch to specify when a deleted domain name is available.

20. The non-transitory computer readable media of claim 19, wherein the drop catch cache has ability to control a delayed availability of a regular pool.

* * * * *